United States Patent
Manczak et al.

(10) Patent No.: US 8,069,305 B2
(45) Date of Patent: Nov. 29, 2011

(54) LOGGING LATENCY REDUCTION

(75) Inventors: Olaf Manczak, Hayward, CA (US);
Eric J. Kustarz, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 695 days.

(21) Appl. No.: 11/828,323

(22) Filed: Jul. 25, 2007

(65) Prior Publication Data
US 2009/0031079 A1    Jan. 29, 2009

(51) Int. Cl.
*G06F 13/10* (2006.01)
(52) U.S. Cl. ........................................ 711/112; 711/158
(58) Field of Classification Search .................... 711/112
See application file for complete search history.

(56) References Cited

U.S. PATENT DOCUMENTS

| | | | |
|---|---|---|---|
| 5,570,332 A * | 10/1996 | Heath et al. | 369/30.1 |
| 6,023,384 A * | 2/2000 | Anderson et al. | 360/48 |
| 6,412,042 B1 * | 6/2002 | Paterson et al. | 711/112 |
| 6,571,298 B1 * | 5/2003 | Megiddo | 710/5 |
| 2004/0193625 A1 * | 9/2004 | Sutoh et al. | 707/100 |

* cited by examiner

*Primary Examiner* — Kenneth Lo
(74) *Attorney, Agent, or Firm* — Marsh Fischmann & Breyfogle LLP; Karl A. Dierenbach; Kent L. Lembke

(57) ABSTRACT

A disk is divided into K angular regions. A log write request is replicated K times and K number of identical log writes are issued to the disk to be written to each of the angular regions of the log. Upon completion of the first write, the application requesting the log write is informed of its completion resulting in a reduction of rotational latency by a factor of K.

11 Claims, 3 Drawing Sheets

LOGGING LATENCY REDUCTION

BACKGROUND OF THE INVENTION

1. Field of the Invention

Embodiments of the present invention relate, in general, to reducing latency experienced in computer logging operations and particularly to reducing rotational latency in log writes.

2. Relevant Background

Durability is a common requirement for all transactional data management systems such as databases or file systems. Durability means that the result (state) of a transaction survives failures and has transactional update semantics (atomicity and consistency). Durable memory is contrasted with volatile memory, which is reset at system restart, and persistent memory, which is not volatile but not necessarily having transactional update semantics. For example, magnetic disk memory is persistent and when combined with a transactional data management software it becomes durable.

In any transactional data management system, when an application requests the system to commit a transaction, all the changes introduced by the transaction have to be made durable, that is they have to be stored in persistent memory (storage). Magnetic disk memory (storage) has a long access time that reflects seek time associated with the platter rotation and movement of the actuator arm to reach a given disk location. In order to lower the time it takes to force all the changes to be written into persistent memory (storage) during a commit operations, most transactional systems use the logging technique. In logging, all changes introduced by a transaction are combined into a single record and appended to a sequential log without any unnecessary seek time. Log information is accessed only during a restart after a crash. Otherwise such log information is later discarded. Typically, this technique allows the transactional system to defer updates to the actual persistent copy of the database or file system data, and to perform such updates in a more optimized way.

Typically, rotating disk memories include one or more disks driven about a spindle axis at approximately, between 5,400 and 15,000 revolutions per minute, or one revolution between every 4 and 11 milliseconds. Each disk has a plurality of concentric tracks, on one or both surfaces from which information is written by a write element. In addition, each track is further divided into a plurality of sectors. A track cylinder is formed by the radially corresponding tracks on the disk memories. In a disk drive system, a disk rotates at a high speed while the read/write element "flies" over the surface of the rotating disk. The write element is positioned over specific areas or sectors of the disk in accordance with commands received from the host computer. It is assumed for purposes of the present application that the read/write element is positioned over the correct track. Thus seek time, the transverse positioning of the read/write element, is not a factor in this application. This application is primarily concerned with the amount of time the disk drive spends waiting for the appropriate position of the disk to rotate under the write element.

Each log entry placed into the log requires processing time by the server. One aspect of this processing time is rotational latency or latency as the result of spinning media. While forms of solid state storage mediums exist, the most common form of storage media is a rotational disk drive. Also called rotational delay, rotational latency is the amount of time it takes for the desired sector of a disk (i.e., the sector from which data is to be read or written) to rotate under the read/write element of the disk drive. The average rotational latency for a disk is half the amount of time it takes for the disk to make one revolution. The term typically is applied to rotating storage devices, such as hard disk drives and floppy drives (and even older magnetic drum systems), but not to tape drives.

Log writes are particularly sensitive to rotational latency. Despite increasing disk drive bandwidth, the average rotational latency in modern enterprise disk drives remains in order of 2 milliseconds. This latency period limits the number of log writes that a file system or database can perform to between 250-400 writes per second. While nonvolatile random access memory (flash) represents a solution to this problem by eliminating mechanical moving parts in the drive entirely, this approach requires special hardware and capital outlay. Disk drives remain the primary storage medium. Typical logging combines requests for a short period of time and writes them off to the disk. On average the writing element of the disk will have to wait for one half of a rotation to arrive at the location on the disk to begin writing, about 2 milliseconds. During this period, the application is idle for it is waiting for a confirmation that the write has occurred due to rotational latency. Thus minimizing rotational latency has broad applicability.

From an application perspective log writes introduce a delay in transaction commit operations. In many cases an application has to stall (remain idle) until the transactional system completes the commit operation, that is until the log write operation finishes. With modern enterprise disk drives an average log write delay, that is time required by a sequential append is about 2 milliseconds (half of a the revolution time), which corresponds to about 2 to 6 million processor cycles. While disk performance is advancing the gap between disk and processor performance increases.

SUMMARY OF THE INVENTION

Briefly stated, embodiments of the present invention involves rotational latency reduction in log writes. A disk is divided into K angular regions. A log write request is replicated K times and K number of identical disk writes are issued to the disk to be written to each of the angular regions of the log. Upon completion of any of the K writes to the disk, the application requesting the write is informed of its completion resulting in a reduction of the application's idle time thus reducing rotational latency by a factor of K.

In another embodiment of the present invention a disk is divided into $K^2$ angular regions. Log writes from a plurality of applications are combined into batches for a period of time equal to $1/K^{th}$ rotation of the disk. The resulting batch is replicated K times creating K identical disk write requests. These replicated batches are issued for writing to the disk at K locations on the disk. The number $K^2$ is based on the number of desired simultaneous disk writes that can be optimally handled for each revolution. The result is the square ($K^2$) of the number of separate writes that are desired to be accomplished. The disk then optimally prioritizes the writes based on the next available region to come under the read/write head. Upon completion of the writing of any of the K writes, the applications that issued the log write requests in the batch are informed that the log write (in this case one of the replicated log writes) has been completed reducing the applications' idle time and thus rotational latency.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
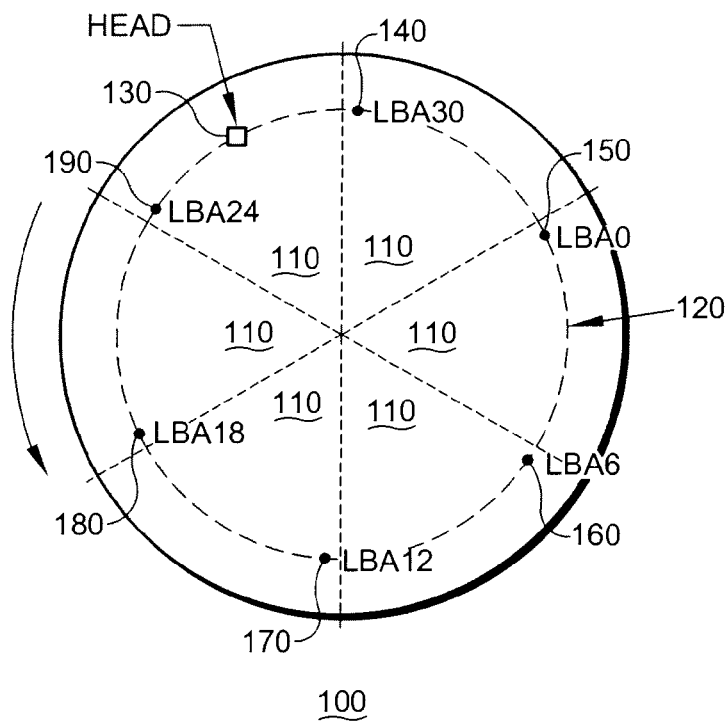
FIG. 1 shows a plan view of a rotating storage medium divided into six uniform regional angular zones or angular regions to which a write to the storage medium is directed, according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

Logging data to a persistent storage medium is a well known technique to enhance a computer systems reliability. As processors continue to advance, the ability for a processor to accomplish a particular task becomes more and more limited by the capability of the system to periodically log that data. Logging is typically done to rotating or rotational storage media, disk drives. Rotational media inherently possess mechanical limits with respect to reading and writing data. One such limit, known as rotational latency can be minimized, according to the present invention, by replication log writes directed to the storage medium and writing them over uniformly distributed regional sectors of a track on the medium.

Rather than require a disk to rotate to the correct position to write a particular log write, the present invention replicates the data and duplicates the issued write directive to multiple regions on the disk. Rather than the disk having to wait on average one half of one rotation of the disk to begin the write, the write can begin at a small fraction of the disk rotation. Once one of the replicated log writes has been completed, the remaining log writes can be ignored and the application, which during this write has remained idle, can continue to operate.

FIG. 1 shows a plan view of a rotating storage medium (disk drive) divided into six uniform regional angular zones or angular regions to which a write to the storage medium is directed, according to one embodiment of the present invention. In one embodiment of the present invention, the disk 100 is divided into K, six in this example, equal and uniformly distributed regions 110. The number of the regions in which the disk is divided into is based in part on the ability of the read/write element 130, also referred to as the disk head, to conduct concurrent operations. Existing protocols require the disk drive to be capable of conducting 256 operations concurrently and in an optimal order. While existing storage protocols such as SCSI or SATA require the disk drive to be capable of conducting 256 concurrent operations, the actual limit on the number of operations that the disk drive can perform in optimal order may be smaller. One aspect of the present invention is reordering these operations such that the closest issued location for a particular write to the read/write element 130 is prioritized as the next write operation. The number of slots in which a disk can be divided for any value $K^2$ is therefore between 4 and 256 regions.

The present invention is scalable. Thus in other embodiments of the present invention the number of angular regions can be distributed among a plurality of tracks on a plurality of rotating mediums. As is described herein, a single disk divided into K region can reduce the rotational latency by a factor of K. By using a plurality of and replicating log writes K times to each of N disks such as in a stack, the factor can be scaled even higher. A stack of N disks, wherein each disk is divided into K regions according to the present invention, can reduce rotational latency by a factor of the product of K and N (that is K*N).

In the embodiment shown in FIG. 1, the disk 100 is divided into six regions 110. Within each region 110, six Logical Block Addresses ("LBAs") have been identified. Thus this embodiment has 36 separate locations, LBAs, on which a write may occur. The number of LBAs is based on the number of simultaneous writes and the number of times this operation is optimally repeated for each revolution. The result is the square of the number of separate writes that are desired to be accomplished. In this embodiment, six concurrent writes of data are issued thus the disk must rotate at least ⅙ of a rotation to arrive at one location. The result is 36 separate LBAs to which data can be written, of which the 36 can be envisioned as 6 sets of 6 LBAs.

Referring now back to FIG. 1, it can be observed that the disk 100 is rotating counterclockwise and at the current position LBA 24 190 has just passed under the read/write element 130. At this point, assume for descriptive purposes, that a log write has been issued to the disk 100. According to one embodiment of the present invention, this single log write will be replicated K times. In this case, the number K is 6. Thus 6 identical log writes are issued to the disk 100. These 6 log writes are distributed uniformly to the 6 regions and are represented at LBA 30 140, LBA 0 150, LBA 6 160, LBA12 LBA 12 170, LBA 18 180 and LBA 24 190.

As the disk rotates, the disk drive reorders the pending 6 writes so that they can be performed in an optimal order. In this case LBA 30 140 is slotted as the next identified location for the log write to be written to. One skilled in the art will recognize that the log write will therefore occur, on average, in 1/(2 K) of the disk rotation. In this case, 1/12 of a rotation, on average.

Figure 2:
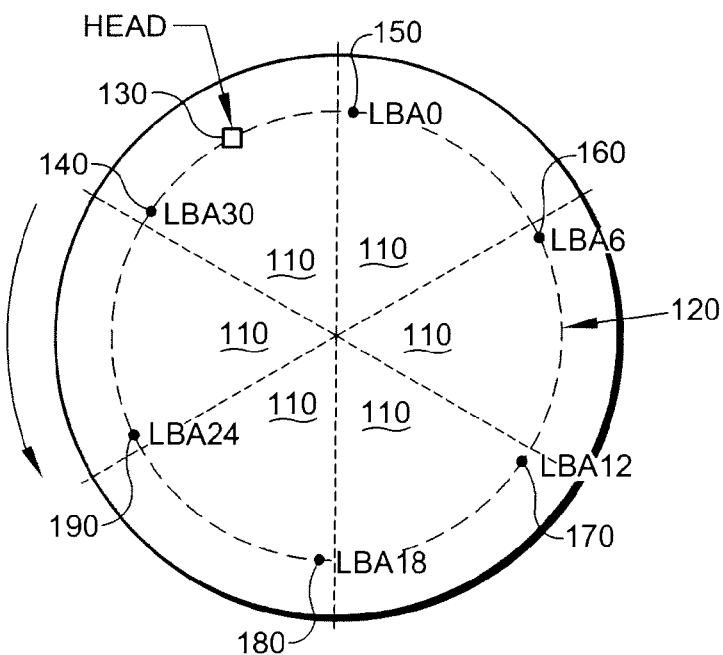
FIG. 2 shows the rotating storage medium of FIG. 1 after rotating counterclockwise and servicing the directed write, according to one embodiment of the present invention.

Turning now in addition to FIG. 2, the rotating storage medium 100 of FIG. 1 after rotating counterclockwise approximately 1/6 of a rotation and servicing the directed write to LBA 30 140, according to one embodiment of the present invention is shown. The read/write element 130 remains over the track and is in position to accomplish the second write of the replicated log write at LBA 0 150.

Figure 3:
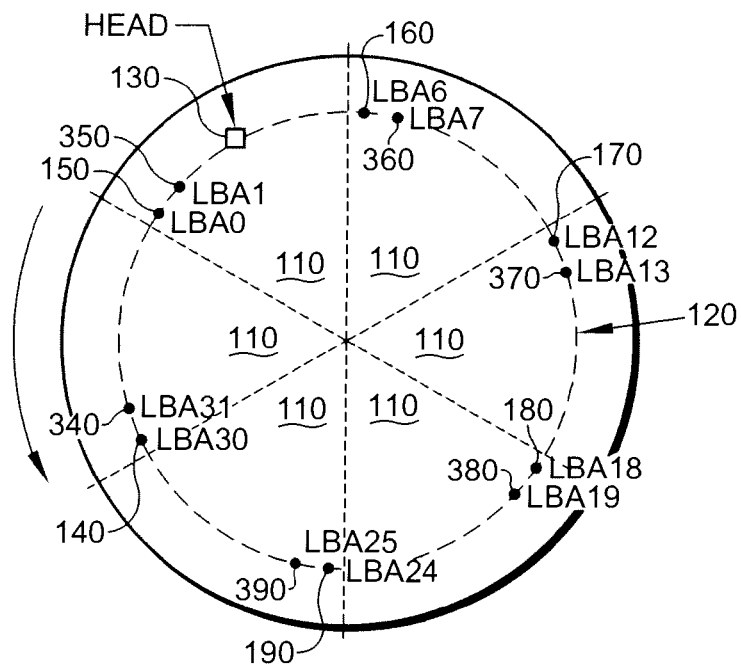
FIG. 3 shows the rotating storage medium of FIG. 2 after rotating counterclockwise with newly issued writing instructions, according to one embodiment of the present invention.
Figure 4:
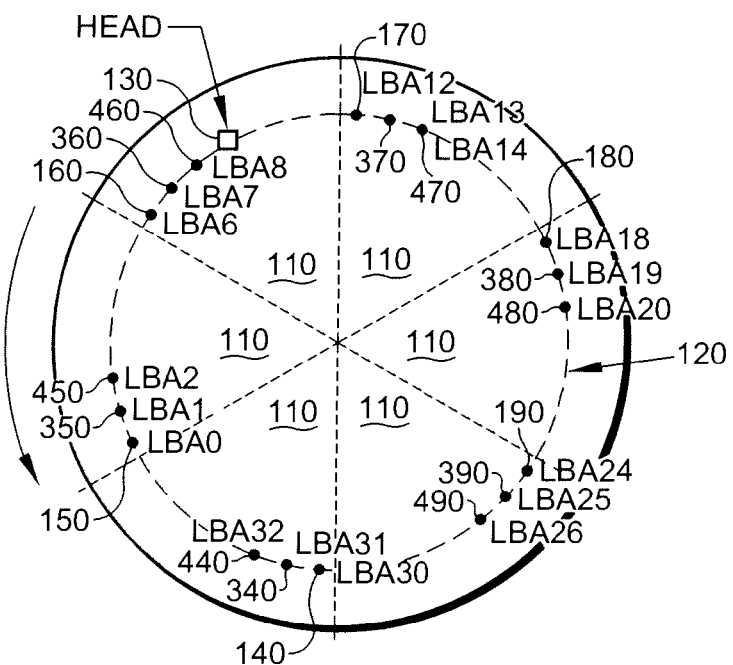
FIG. 4 shows the rotating storage medium of FIG. 3 after rotating counterclockwise with additional newly issued writing instructions while a previous issued write is serviced, according to one embodiment of the present invention.

FIG. 3 shows the rotating storage medium 100 of FIG. 2 after rotating counterclockwise another 1/6 of a rotation with newly issued writing instructions for a new log write, according to one embodiment of the present invention. Recall that the log writes of the previously issued write to LBA 6 160, LBA 12 170, LBA 18 180 and LBA 24 190 remain pending. The next write is therefore directed to LBA 1 350, LBA 7 360, LBA 13 370, LBA 19 380, LBA 25 390 and LBA 31 340. At the issuance of the write the next LBA which falls under the read/write element 130 that has a pending write issued to it is LBA 6 160 from the previous log write. Immediately thereafter, and as shown in FIG. 4, the newly issued log write to LBA 7 360 is performed and a message sent to the issuing application that the log has been completed.

As further shown in FIG. 4 a new log write is again issued. The log write is replicated 6 times, in this embodiment of the present invention, and these writes are assigned to the next available set of LBAs. In this case they include LBA 2 450, LBA 8 460, LBA 14 470, LBA 20 480, LBA 26 490 and LBA 32 440. As the disk 100 rotates, the log writes of the previously issued writes are accomplished at LBA 12 170 and LBA 13 370 as well as the first of the new log write at LBA 14 470. Once LBA 14 470 is written, a message is sent to the issuing application that the log write has been completed.

For every 1/6 of a turn, or 1/K in a general sense, a new write can be issued to the disk. Multiple log requests are therefore, in one embodiment of the present invention, combined into a single write. Every 1/K of a rotation, the pending log writes can be batched up into a single write and this single write is issued to the device. In that manner there is always available locations on the disk for the write. The result is a decrease in the rotational latency by a factor of K. In this case rotational latency for log writes is reduced by a factor of 6. Significantly, one aspect of the present invention is the disk's ability to reorder the number of issued write requests so the pending requests are performed in an optimal order.

As previously mentioned, while the disk 100 is rotating and the read/write element 130 is positioned over LBA 30 140, the other 5 writes of the first example remain pending since in this embodiment there is no way to remove them from the queue. The only way to prevent this excess of writes is to prevent them from being originally issued. In another embodiment of the present invention, the number of issued, replicated writes is diminished based on the position of the read/write head 130.

Recall once the first write has been accomplished, a message back to the application that issued the write is communicated informing the application that the write has successfully occurred and where the data exists on the disk. In another embodiment of the present invention, the position of the read/write element 130, gained from this communication, is utilized to manage the number of write requests. For example, as illustrated in this example and referring back to FIG. 1, the read/write element 130 is originally positioned over LBA 30 140 and performs one of the pending 6 writes in the queue. Again assume that another write request is generated. Since the previous write was slotted to be written to LBA 0 150, LBA 6 160, LBA 12 170, LBA 18 180, LBA 24 190 and LBA 30 140, the next available group of 6 LBAs would be LBA 1 350, LBA 7 360, LBA 13 370, LBA 19 380, LBA 25 390 and LBA 31 340. In this embodiment of the present invention, the communication to the application issuing the log write request includes identification of where the log is written, i.e. LBA 30 140. This communication is monitored thus the read/write head's 130 position relative to the other LBA's is now known. Since the write to LBA 30 140 has been written, yet the replicated write to LBA 0 150 has not, the read/write head's 130 position must be somewhere between LBA 30 140 and LBA 0 150. Accordingly, with respect to the next set of write requests, it is not necessary to issue all of the 6 replicated write requests. It is logical to assume that should the next write request be issued before the passing of LBA 0 150 that this new write request will be issued and written to LBA 1 350.

Thus knowing the position of the read/write element 130 with respect to the various regions of the disk allows only the log write for the next LBA or the next few LBAs to arrive under the read/write element 130 to be issued. Accordingly only a portion of the K number of replicated writes need to be issued. This increases the overall allowable bandwidth to be written to the disk and ultimately allows for full logging but with the reduced impact of rotational latency. The ability to manage the issuance of log writes is directly due to the large and increasing differential in rotation speed of the storage medium as opposed to processor speed. Processors continue to operate at ever increasing speeds. Thus for the passing of each LBA under the read/write head 130, one or two million processor cycles may take place. This is more than enough time to completely monitor and analyze the position of the head 130 and issue only a limited number of the replicated writes, rather than one for each region.

Figure 5:
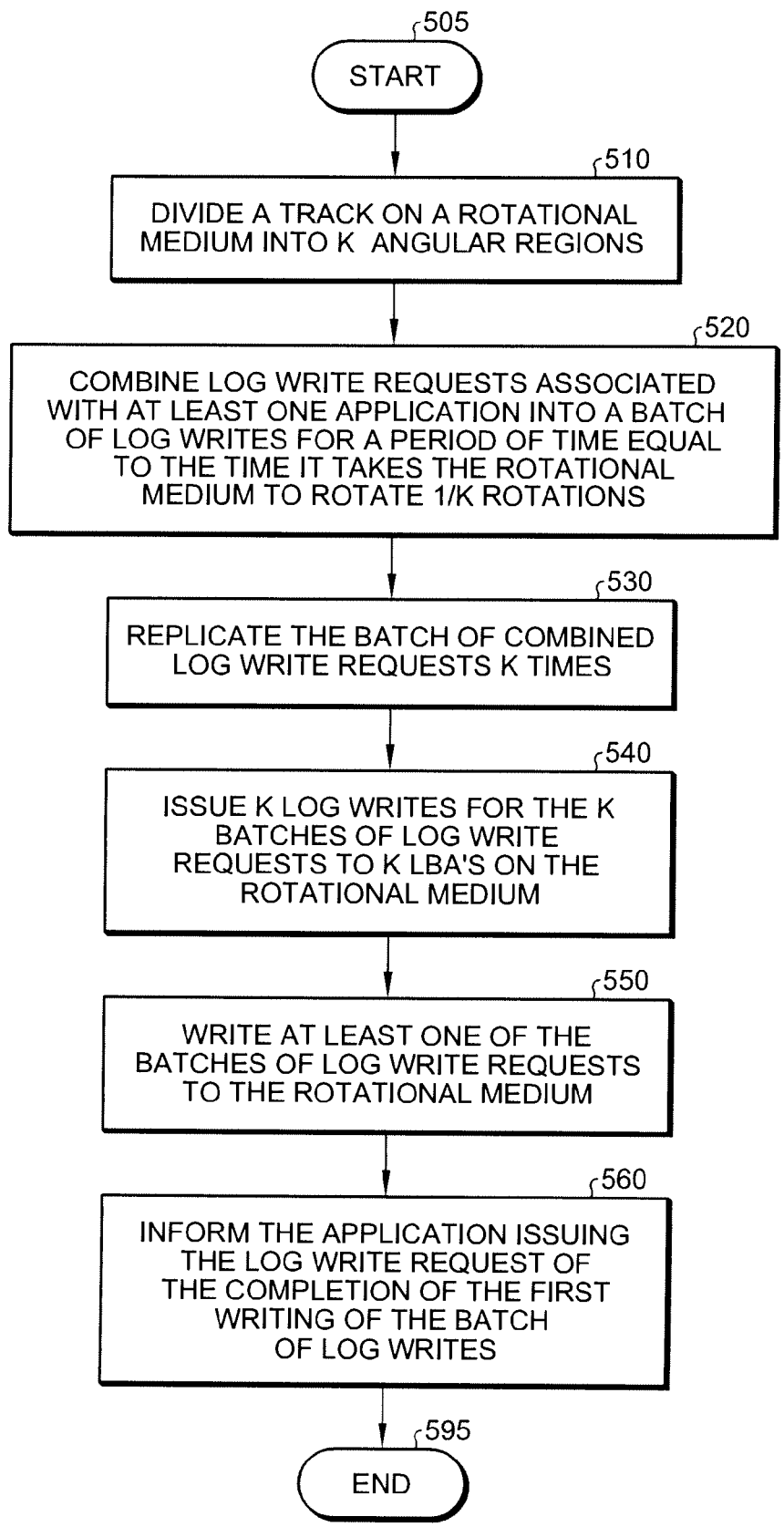
FIG. 5 is a high-level flow diagram of one method embodiment for reducing rotational latency according to the present invention.

FIG. 5 is a flowchart illustrating a method of implementing an exemplary process for decreasing rotational latency associated with a log write request issued by an application to a rotating medium using a data writing element. In the following description, it will be understood that each block of the flowchart illustration, and combinations of blocks in the flowchart illustration, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustration supports combinations of means for performing the specified functions and combinations of steps for performing the specified functions. It will also be understood that each block of the flowchart illustration, and combinations of blocks in the flowchart illustration, can be implemented by special purpose hardware-based computer systems which perform the specified functions or steps, or combinations of special purpose hardware and computer instructions.

Referring now in addition to FIG. 5, a method for reducing rotation latency begins 505 with the division 510 of a track on a rotational medium into K angular regions. Indeed K can be any cardinal number greater or equal than 2 such that $K^2$ is less or equal to the maximum number of requests that a disk can conduct concurrently and perform in an optimal order. Currently, the maximum value of $K^2$ for the existing versions of SCSI and SATA storage protocols is 256. However, many drives cannot handle that many random requests in an optimal way. Therefore, from empirical data, the maximum number of requests that drives can reorder efficiently is between 30 and 100 which leads to $K^2$ between 25 and 81, that is K between 5 and 9. However, one can expect that newer drives will be able to handle efficiently more requests as the disk drives caches get substantially larger. Such improvements are contemplated and within the scope of the present invention.

At about the same time as the division of a track 510, log write requests issued from a plurality of applications are combined 520 over a period of time equal to 1/K of one rotation of the rotational medium into batches of log requests. Each of these batches can be viewed as a single disk write.

Thereafter the write request (recall each write represents a batch of requests) is replicated 530 K number of times yielding K log writes. A command is issued directing 540 these K log write requests be written to the rotational medium. Under this command at least one of the log write requests is written 550 to the rotational medium. After the first log write request is written to the rotational medium, information confirming the write is conveyed 560 to the issuing applications so that the applications can process further data. While the remaining writes continue to be written to the disk as the method concludes 595, the application can process data resulting in a K factor reduction in rotational latency.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A method for decreasing rotational latency associated with a log write issued by an application to a rotating medium using a data writing element, the method comprising:

dividing a track on the rotating medium into a plurality of discrete angular regions;

replicating said log write to form a plurality of identical disk writes equal in number to the plurality of discrete angular regions;

writing the plurality of identical disk writes to the plurality of discrete angular regions of the track such that each one of the plurality of discrete angular regions comprises one of the plurality of identical disk writes; and responsive to completion of a first disk write of the plurality of identical disk writes to one of the plurality of discrete angular regions of the track, informing said application of completion of the log write, wherein upon completing a second disk write of the plurality of identical disk writes, the method further comprises ignoring thereafter the second disk write of the plurality of identical disk writes, wherein said application is not informed of the completing of the second disk write of the plurality of identical disk writes, wherein the application is idle during the first disk write and is not idle during the second disk write and the application can continue to operate.

2. The method of claim 1 wherein said plurality of discrete angular regions are uniformly distributed throughout the track.

3. The method of claim 1 wherein each log write issued by said application includes unique identification information linking said log write to said application.

4. The method of claim 1 wherein said plurality of discrete angular regions are distributed among a plurality of tracks on a plurality of rotating mediums.

5. The method of claim 1 further comprising:

monitoring the data writing element location with respect to the plurality of discrete angular regions of the track, wherein said informing step comprises communicating information as to which of the plurality of discrete angular regions said first disk write was written to, wherein said monitoring comprises utilizing said information;

replicating a next in time log write to form a next plurality of identical disk writes equal in number to the plurality of discrete angular regions; and limiting, based on said information, the writing of the next in time log write to the discrete angular region of the track immediately ahead of the discrete angular region said first disk write was written to.

6. A method for decreasing rotational latency associated with a plurality of log write requests issued by a plurality of applications to a rotating medium using a data writing element, the method comprising:

dividing a track on the rotating medium into K discrete angular regions, wherein K is an integer greater than or equal to the number 2 such that K squared is less than or equal to a maximum number of requests said rotational medium can concurrently conduct:

combining, into a disk write, the plurality of log write requests, wherein the combining occurs over a first period of time, wherein the first period of time is equal to a multiplicative inverse of K multiplied by a period of time of one rotation of the rotating medium;

replicating said disk write to form K identical disk writes;

writing the K identical disk writes to the K discrete angular regions on the track of the rotating medium; and communicating to the plurality of applications a completion of a first disk write of the K identical disk writes to one of the K discrete angular regions of the track, wherein each of the plurality of log write requests issued by each of said plurality of applications includes unique identification information linking each of the plurality of log write requests to at least one of the plurality of applications wherein upon completing a second disk write of the K identical disk writes, the method further comprises ignoring thereafter the second disk write of the K identical disk writes, wherein said plurality of applications are not informed of the completing of the second disk write of the K identical disk writes, wherein the applications are idle during the first disk write and are not idle during the second disk write and the applications can continue to operate.

7. The method of claim 6 wherein said K discrete angular regions are uniformly distributed throughout the track.

8. The method of claim 6 wherein said K discrete angular regions are distributed among a plurality of tracks on a plurality of rotating mediums.

9. The method of claim 1, wherein said informing said application of completion of the log write occurs during said writing said plurality of identical disk writes to said plurality of discrete angular regions.

10. The method of claim 1, further comprising limiting the writing of a next in time log write to a discrete angular region of the track immediately ahead of the discrete angular region to which the first disk write was written to.

11. The method of claim 1, wherein said application is not informed of the completing of the writing of the plurality of identical disk writes.

* * * * *